(12) United States Patent
Vonk

(10) Patent No.: US 12,276,030 B2
(45) Date of Patent: Apr. 15, 2025

(54) METAL PRETREATMENT COMPOSITIONS CONTAINING PHENALKAMINE COMPOUNDS

(71) Applicant: Henkel AG & Co. KGaA, Duesseldorf (DE)

(72) Inventor: Donald R. Vonk, Clinton Township, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 889 days.

(21) Appl. No.: 17/345,278

(22) Filed: Jun. 11, 2021

(65) Prior Publication Data

US 2021/0317583 A1    Oct. 14, 2021

Related U.S. Application Data

(63) Continuation of application No. PCT/US2019/065127, filed on Dec. 9, 2019.

(60) Provisional application No. 62/780,471, filed on Dec. 17, 2018.

(51) Int. Cl.

| C23C 22/48 | (2006.01) |
| C01G 25/00 | (2006.01) |
| C01G 25/02 | (2006.01) |
| C23C 22/06 | (2006.01) |
| C23C 22/34 | (2006.01) |

(52) U.S. Cl.
CPC ............ C23C 22/48 (2013.01); C01G 25/006 (2013.01); C01G 25/02 (2013.01)

(58) Field of Classification Search
None
See application file for complete search history.

(56) References Cited

U.S. PATENT DOCUMENTS

| 4,457,790 A | 7/1984 | Lindert et al. |
| 4,517,028 A | 5/1985 | Lindert |
| 4,992,116 A | 2/1991 | Hallman |
| 5,039,770 A | 8/1991 | Lindert et al. |
| 5,068,299 A | 11/1991 | Lindert et al. |
| 5,266,410 A | 11/1993 | Lindert et al. |
| 5,298,289 A | 3/1994 | Lindert et al. |
| 5,891,952 A | 4/1999 | McCormick et al. |
| 7,063,735 B2 | 6/2006 | Fristad et al. |
| 2003/0192624 A1* | 10/2003 | Siebert ............... B05D 7/54 148/251 |
| 2004/0163735 A1 | 8/2004 | Matsukawa et al. |
| 2006/0172064 A1 | 8/2006 | Kolberg et al. |
| 2008/0302448 A1 | 12/2008 | Frey et al. |
| 2011/0281120 A1 | 11/2011 | Schmidt et al. |
| 2016/0208099 A1 | 7/2016 | Dong et al. |
| 2016/0215630 A1 | 7/2016 | Krishna et al. |

FOREIGN PATENT DOCUMENTS

| CN | 1408031 A | 4/2003 | |
| CN | 1510167 A | 7/2004 | |
| CN | 102197161 A | 9/2011 | |
| EP | 1266047 B1 | 11/2003 | |
| JP | 2002-80564 * | 3/2002 | ............ C08G 59/62 |
| JP | 2002080564 A * | 3/2002 | |
| KR | 1020170120322 A | 10/2017 | |

OTHER PUBLICATIONS

Supplementary European Search Report for EP 19901255 dated Jul. 7, 2022.
International Search Report for International Application PCT/US2019/065127, mailed May 11, 2020.

* cited by examiner

*Primary Examiner* — Lois L Zheng
(74) *Attorney, Agent, or Firm* — Mary K. Cameron

(57) ABSTRACT

A conversion coating composition for treating a metal surface contains one or more Group IV metal ions, such as titanium, zirconium and/or hafnium metal ions, and one or more phenalkamine compounds, such as a Mannich addition product of cardanol, formaldehyde and a polyamine. The conversion coating composition is an aqueous acidic solution or dispersion. Metal surfaces contacted with the conversion coating composition have enhanced corrosion resistance and paint adhesion characteristics.

49 Claims, No Drawings

METAL PRETREATMENT COMPOSITIONS CONTAINING PHENALKAMINE COMPOUNDS

FIELD OF THE INVENTION

This invention relates generally to metal pretreatment compositions and more particularly to metal pretreatment compositions for corrosion protection and paint adhesion, methods of making and applying the metal pretreatment compositions and metal substrates having a metal pretreatment coating deposited thereon.

BACKGROUND OF THE INVENTION

Many consumer and industrial goods are formed from metal substrates and are exposed to the elements. As such, these metal goods are subject to corrosive environments thus they are often coated in protective coatings including corrosion protection coatings and paints. Many such corrosion protective coatings are known as conversion coatings, which are understood in the art to be a type of metal pretreatment formed by contacting a metallic surface with a metal pretreatment composition, i.e., a conversion coating composition, which modifies the metallic surface and forms a conversion coating thereon. While these conversion coatings offer protection, improvements in the corrosion resistance of metal conversion coatings is an ongoing market requirement for automotive and white goods applications. Past conversion coatings have included use of Periodic Table Group IV metals and oxides of the same, especially zirconium and titanium. These coatings have been effective; however, improvements continue to be sought.

Attempts have been made to improve performance of metal pretreatment coatings by the addition of polymers to the metal pretreatment coating compositions or by applying polymer-containing post-rinses to the as-deposited coating, see U.S. Pat. No. 4,457,790 (Lindert et al.); U.S. Pat. No. 5,039,770 (Lindert et al.); U.S. Pat. No. 5,068,299 (Lindert et al.); U.S. Pat. No. 5,298,289 (Lindert et al.); U.S. Pat. No. 5,891,952 (McCormick et al.), and U.S. Pat. No. 5,266,410 (Lindert et al.).

It is desirable to reduce storage and stability issues sometimes caused by polymeric materials present in metal pretreatment compositions while providing the benefit of a single component composition.

SUMMARY OF THE INVENTION

According to one aspect of the invention, an acidic aqueous conversion coating composition is provided which comprises at least one Group IV metal and a phenalkamine compound or a mixture of phenalkamine compounds. Contacting metal substrates with the conversion coating composition chemically deposits a coating comprising Group IV metal oxides and phenalkamine compound(s), and optionally metals from the substrate, on metal surfaces of the substrates. Deposition may be accomplished within brief contact times ranging from approximately 30 seconds to 300 seconds being preferred, as well as other desirable contact times as described herein. The mixed metal oxide and phenalkamine compound conversion coating provides improved corrosion resistance on CRS (cold rolled steel) and other metal substrates, as well as improved paint adhesion properties compared to similar or the same Group IV conversion coating compositions coin the absence of phenalkamine.

According to one aspect of the present invention ("Aspect 1"), an acidic aqueous conversion coating composition is provided which is comprised of, consists essentially of, or consists of: at least one Group IV metal; and at least one phenalkamine component. Further aspects of the invention may be summarized as follows:

Aspect 2: The composition of Aspect 1, wherein the at least one phenalkamine component comprises at least one phenalkamine compound corresponding to Formula (I):

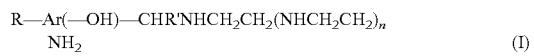

$$R\text{—}Ar(\text{—}OH)\text{—}CHR'NHCH_2CH_2(NHCH_2CH_2)_n\\NH_2 \qquad (I)$$

wherein Ar is a benzene ring, R is a C6-C30 saturated or unsaturated alkyl group, R' is H or an alkyl group, and n is 0 or an integer of at least 1.

Aspect 3: The composition of Aspect 2, wherein R is a branched C6-C30 unsaturated alkyl group.

Aspect 4: The composition of Aspect 2, wherein R is a straight chain C6-C30 unsaturated alkyl group.

Aspect 5: The composition of any of Aspect 2-4, wherein R comprises from 1 to 4 carbon-carbon double bonds.

Aspect 6: The composition of any of Aspect 2-5, wherein R is —$C_{15}H_{31-x}$ and x is 0, 2, 4 or 6.

Aspect 7: The composition of any of Aspect 2-6, wherein n is 0, 1, 2, or 3.

Aspect 8: The composition of any of Aspect 2-7, wherein —OH and —$CHR'NHCH_2CH_2(NHCH_2CH_2)_n NH_2$ are ortho to each other on the benzene ring.

Aspect 9: The composition of any of Aspect 2-8, where R' is a C1-C6 alkyl group, preferably a C1-C3 alkyl group.

Aspect 10: The composition of any of Aspect 1-9, wherein the at least one phenalkamine compound comprises at least one phenalkamine compound which is a Mannich reaction product of at least one alkylphenol having at least one C6-C30 saturated or unsaturated alkyl group substituted on a benzene ring, at least one aldehyde, and at least one amine comprised of at least one primary or secondary amino group.

Aspect 11: The composition of any of Aspect 1-10, wherein the at least one alkylphenol comprises at least one cardanol.

Aspect 12: The composition of any of Aspect 1-11, wherein the at least one aldehyde comprises formaldehyde or paraformaldehyde.

Aspect 13: The composition of any of Aspect 1-12, wherein the at least one amine comprises at least one polyamine.

Aspect 14: The composition of any of Aspect 1-13, wherein the at least one amine comprises at least one of ethylenediamine or a polyethylenepolyamine.

Aspect 15: The composition of any of Aspect 1-14, additionally comprising one or more additional components selected from the group consisting of copper, free fluoride, zinc, nitrate and Si-based substances.

Aspect 16: The composition of any of Aspect 1-15, wherein the acidic aqueous pretreatment composition has a pH of 5.0 or less.

Aspect 17: The composition of any of Aspect 1-16, wherein the at least one phenalkamine compound is present in a total concentration of from 5 to 10,000 ppm.

Aspect 18: The composition of any of Aspect 1-17, wherein the at least one Group IV metal is present in a total concentration of from 50 to 750 ppm.

Aspect 19: A method of conversion-coating a substrate having a metal surface, comprising a step of contacting the metal surface of the substrate with the composition of any of Aspect 1-18.

Aspect 20: A substrate having a metal surface comprising a conversion coating deposited thereon, wherein the conversion coating is comprised of at least one Group IV metal oxide and at least one phenalkamine compound.

The use of phenalkamine compound(s) and Group IV metals provides excellent paint adhesion without the need to utilize added copper ions. This allows manufacture and use of Group IV metal oxide-depositing conversion coating compositions in the absence of dissolved copper, i.e., in the absence of Cu ions other than trace amounts from other components such as water, while maintaining performance properties (e.g., corrosion resistance and paint adhesion) at least as good as similar or the same Group IV metal oxide-depositing conversion coating compositions containing added dissolved copper (but no phenalkamine compound).

DETAILED DESCRIPTION OF CERTAIN EMBODIMENTS OF THE INVENTION

For a variety of reasons, it is preferred that conversion coating compositions containing phenalkamine compounds may be substantially free from many ingredients used in compositions for similar purposes in the prior art. Specifically, it is increasingly preferred in the order given, independently for each preferably minimized ingredient listed below, that at least some embodiments of conversion coating compositions according to the invention, when directly contacted with metal in a process according to this invention, contain no more than 1.0, 0.5, 0.35, 0.10, 0.08, 0.04, 0.02, 0.01, 0.001, or 0.0002 percent, more preferably said numerical values in grams per liter, more preferably in ppm, of each of the following constituents: chromium, nitrite ions, formaldehyde, formamide, hydroxylamines, ammonia; rare earth metals; sulfate; permanganate; perchlorate; boron, e.g. borax, borate; strontium; and/or free chloride. Also, it is increasingly preferred in the order given, independently for each preferably minimized ingredient listed below, that at least some embodiments of as-deposited coatings according to the invention, contain no more than 1.0, 0.5, 0.35, 0.10, 0.08, 0.04, 0.02, 0.01, 0.001, or 0.0002 percent, more preferably said numerical values in parts per thousand (ppt), of each of the following constituents: chromium, cyanide, nitrite ions, formaldehyde, formamide, hydroxylamines, ammonia; rare earth metals; sulfate; permanganate; chlorites and perchlorates; boron, e.g. borax, borate; strontium; and/or free chloride.

The term "paint" as used herein includes all like materials that may be designated by more specialized terms such as lacquer, enamel, varnish, shellac, topcoat, color coat, clearcoat, primer, electrocoat, autodepositing coating and the like; and, unless otherwise explicitly stated or necessarily implied by the context. The simple term "metal" or "metallic" will be understood by those of skill in the art to mean a material, whether it be an article or a surface, that is made up of atoms of one or more metal elements, e.g. aluminum or iron, the metal elements present in amounts of at least, with increasing preference in the order given, 55, 65, 75, 85, or 95 atomic percent, for example the simple term "aluminum" includes pure aluminum and those of its alloys that contain at least, with increasing preference in the order given, 55, 65, 75, 85, or 95 atomic percent of aluminum atoms. A bare metallic surface will be understood to mean a metallic surface in the absence of a coating layer, other than oxides of metals derived from the metallic surface through aging in air and/or water.

Other than in the operating examples, or where otherwise indicated, all numbers expressing quantities of ingredients, reaction conditions, or defining ingredient parameters used herein are to be understood as modified in all instances by the term "about". Throughout the description, unless expressly stated to the contrary: percent, "parts of", and ratio values are by weight or mass; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) between one or more newly added constituents and one or more constituents already present in the composition when the other constituents are added; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise, such counterions may be freely selected, except for avoiding counterions that act adversely to an object of the invention; molecular weight (MW) is weight average molecular weight unless otherwise specified; the word "mole" means "gram mole", and the word itself and all of its grammatical variations may be used for any chemical species defined by all of the types and numbers of atoms present in it, irrespective of whether the species is ionic, neutral, unstable, hypothetical or in fact a stable neutral substance with well-defined molecules.

In one aspect the invention provides acidic aqueous pretreatment, e.g., conversion coating, compositions comprising:

A) at least one dissolved Group IV metal; and
B) at least one dissolved or dispersed phenalkamine component comprising one or more phenalkamine compounds.

Such compositions are capable of depositing Group W metal oxides on metal surfaces. Suitable Group IV metals include Zr, Ti and Hf and combinations thereof. Especially preferred in the present invention are Zr and Ti (including Zr and Ti in combination). Preferably, such Group IV metal or metals are present in ionic form in the conversion coating composition. According to preferred embodiments, the Group IV metal(s) is or are dissolved in the conversion coating composition. The Group IV metal(s) may be provided by formulating the conversion coating composition using a water-soluble acid or salt of the Group IV metal. Suitable soluble acids include, for example, fluoroacids of Group IV metals such as hexafluorotitanic acid, hexafluorozirconic acid, and hexafluorohafnic acid and combinations thereof. Salts of fluoroacids may also be used, particularly alkali metal salts of fluoroacids such as $K_2ZrF_6$ or $Na_2ZrF_6$. Suitable soluble salts include, for example, the nitrate, sulfate, fluoride, acetate, oxalate, citrate and chloride salts of Zr, Ti and/or Hf.

As used herein, the term "phenalkamine compound" means a molecule comprising a benzene ring having at least three functional groups attached to the benzene ring:

a.) an OH (i.e. hydroxyl) group;
b.) a C6-C30 saturated or unsaturated alkyl group; and
c.) an amine-functionalized substituent, such as an aminoalkyl substituent.

Desirably, the phenalkamine compound or mixture of phenalkamine compounds employed in the present invention is selected such that it is water soluble or water dispersible. Suitable phenalkamine compounds desirably have a viscosity enabling incorporation of the polymer into the pretreatment bath to a dissolved or dispersed state, at temperatures ranging from room temperature to about 35° C. Once dissolved or dispersed in the pretreatment composition or bath, phenalkamine compounds should remain stably dissolved and/or dispersed in the composition against spontaneous separation or segregation of bulk phases that is perceptible with normal unaided human vision during storage at 25° C. for at least 10 days after preparation of the pretreatment composition or bath. In a preferred embodiment, the phenalkamine compounds resist hydrolysis in the acidic pretreatment composition such that less than about 40, 30, 20, 10, 5 or 1 wt %. is hydrolyzed under the above-described storage conditions.

In a preferred embodiment, the phenalkamine compound(s) are fully dissolved (solubilized) in the conversion coating composition. For example, the phenalkamine compound(s) preferably has or have a solubility in acidic water (e.g., water having a pH of from about 1.8 to about 5) at 25° C. of at least 5, 10, 15, 20, 25, 30, 35, 40, 45 or 50 ppm or even higher.

In accordance with one embodiment of the invention, the phenalkamine compound corresponds to Formula (I):

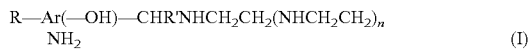

wherein
Ar is a benzene ring,
R is a C6-C30 linear or branched, saturated or unsaturated alkyl group,
R' is H or an alkyl group (e.g., C1-C6 or C1-C3 alkyl, such as methyl, ethyl, propyl, etc.), and n is 0 or an integer of at least 1, 2, 3, 4, 5 and not more than 20, 18, 16, 14, 12, 10, 8, or 6, preferably 1-4.

Mixtures or combinations of phenalkamine compounds may also be utilized.

According to one embodiment, substituents a.) and c.) are ortho to each other; i.e., they are attached to adjacent carbon atoms of the benzene ring.

According to a further embodiment, substituent b.) is attached to a carbon atom of the benzene ring that is separated by at least one carbon atom of the benzene ring from each of the carbon atoms to which substituents a.) and c.) are attached.

In another embodiment, substituent c.) is ortho to substituent a.) and substituent b.) is meta to substituent a.).

The benzene ring may bear one or more additional non-hydrogen substituents other than substituents a.), b.) and c.). However, it is preferred that the benzene ring is free of halogen-containing substituents. Suitable non-hydrogen substituents which may be present on the benzene ring include, for example, alkyl groups (e.g., methyl, ethyl), and hydroxyl (in addition to substituent a.)). For example, a second optional hydroxyl group may be present on the benzene ring in a position meta to substituent c.). In one embodiment, the phenalkamine compound(s) may be free of hydroxyl groups that are ortho to substituent a).

Substituent c.), the amine-functionalized substituent, may comprise one or more amino groups, preferably primary and/or secondary amino groups, substituted on an alkylene group wherein the alkylene group is attached to the benzene ring. In one embodiment, substituent c.) is comprised of at least one primary amino group. In another preferred embodiment, substituent c.) is comprised of two or more primary and/or secondary amino groups. The amino groups may, for example, be present in the form of an ethylenediamine group (—NHCH$_2$CH$_2$NH$_2$) or a polyethylenepolyamine group (—NHCH$_2$CH$_2$(NHCH$_2$CH$_2$)$_n$NH$_2$, where n is an integer of 1 or more) bonded to an alkylene group (such as —CH$_2$— or —CHR—, where R is an alkyl group such as methyl, ethyl, propyl, etc.), which in turn is attached to a carbon atom of the benzene ring.

In accordance with one embodiment of the invention, the phenalkamine compound corresponds to Formula (II):

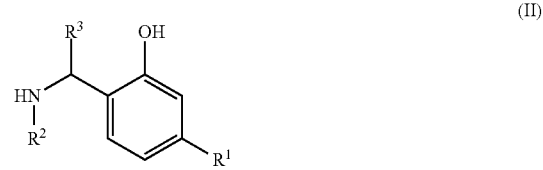

wherein
R$^1$ is a C6-C30 saturated or unsaturated alkyl group;
R$^2$ is H$_2$N(CH$_2$CH$_2$NH)$_n$CH$_2$CH$_2$—; n is 0 or an integer of at least 1 (e.g., 1, 2, 3, 4 or more, desirably 0-16, preferably 1-4); and
R$^3$ is H or an alkyl group (e.g., C1-C6 or C1-C3 alkyl, such as methyl, ethyl, propyl, etc.).

Mixtures or combinations of such phenalkamine compounds may also be utilized.

In preferred embodiments, R in Formula (I) or R$^1$ in Formula (II) is unsaturated (R$^1$ or R thus may be a C6-C30 alkenyl group). In embodiments where a mixture of phenalkamine compounds is used, it is preferred that at least a portion of the phenalkamine compounds in such mixture have R$^1$ or R groups which are unsaturated. The C6-C30 alkyl group R$^1$ or R may, for example, comprise from 1 to 4 carbon-carbon double bonds. According to one embodiment, the phenalkamine compound does not have a carbon-carbon double bond in which one of the carbon atoms involved in the carbon-carbon double bond is directly bonded to a carbon atom of the benzene ring (i.e., the phenalkamine compound is free of a structural moiety corresponding to Ar—C=C). The carbon-carbon double bond(s) may otherwise appear anywhere within alkyl group R$^1$ or R. According to one embodiment, if alkyl group R$^1$ or R contains two or more carbon-carbon double bonds, none of the carbon-carbon double bonds are conjugated double bonds. The carbon-carbon double bonds may appear in cis and/or trans configurations. A carbon-carbon double bond may appear at a terminal end of the alkyl group or at an internal position in the alkyl group. If two or more carbon-carbon double bonds are present in the alkyl group, one carbon-carbon double bond may be present at a terminal end of the alkyl group and one or more carbon-carbon double bonds may be present at internal positions of the alkyl group.

The alkyl group may be a straight chain alkyl group or a branched alkyl group. According to various aspects of the invention, the alkyl group may comprise 6 to 30 carbon atoms, 8 to 24 carbon atoms, 10 to 20 carbon atoms, 12 to 18 carbon atoms, or 15 carbon atoms. The alkyl group may, for example, be a C15 straight chain alkyl group containing 0, 1, 2 or 3 carbon-carbon double bonds, such as —(CH$_2$)$_{14}$CH$_3$, —(CH$_2$)$_6$—CH=CH—CH$_2$—CH=CH—(CH$_2$)$_3$CH$_3$, —(CH$_2$)$_7$—CH=CH—CH$_2$—CH=CH—CH$_2$—CH=CH$_2$, —(CH$_2$)$_7$—CH=CH—CH$_2$—CH=CH—(CH$_2$)$_2$CH$_3$, or —(CH$_2$)$_7$—CH=CH—(CH$_2$)$_5$CH$_3$. Thus, in certain embodiments, $R^1$ or R is —$C_{15}H_{31-x}$ and x is 0, 2, 4 or 6. Preferably, where a mixture of phenalkamine compounds is utilized, x in at least a portion of the phenalkamine compounds in the mixture is 2, 4 or 6. According to preferred embodiments of the invention, the alkyl group is a hydrocarbyl group (i.e., it does not contain any elements other than carbon and hydrogen).

In one embodiment, the phenalkamine compound(s) correspond(s) to the following Formula (III):

R—Ar(OH)—CHR'NHCH$_2$CH$_2$(NHCH$_2$CH$_2$)$_n$NH$_2$  (III)

wherein
Ar is an aryl group (e.g., a benzene ring);
n is 0 or an integer of 1 or greater (e.g., n=0 to 10);
R' is H or C1-C6 alkyl; and
R is —(CH$_2$)$_{14}$CH$_3$, —(CH$_2$)$_7$CH═CH(CH$_2$)$_5$CH$_3$, —(CH$_2$)$_7$CH═CHCH$_2$CH═CH—(CH$_2$)$_2$CH$_3$ or —(CH$_2$)$_7$CH═CHCH$_2$CH═CHCH$_2$CH═CH$_2$;
wherein OH is ortho to —CHR'NHCH$_2$CH$_2$(NHCH$_2$CH$_2$)$_n$NH$_2$ and R is para to —CHR'NHCH$_2$CH$_2$(NHCH$_2$CH$_2$)$_n$NH$_2$.

Mixtures of phenalkamine compounds corresponding to any of Formulae (I), (II), (III) and combinations thereof may be employed as the phenalkamine component in certain embodiments of the invention.

Methods of preparing phenalkamine compounds are well known in the art and any of such methods may be used to obtain phenalkamine compounds suitable for use in the present invention. One such method involves the Mannich reaction of an alkylphenol, an aldehyde and an amine (mixtures of such reactants, such as mixtures of different amines, may be used in such reactions). In one embodiment, the at least one phenalkamine compound comprises at least one phenalkamine compound which is a Mannich reaction product of at least one alkylphenol having at least one C6-C30 saturated or unsaturated alkyl group substituted on a benzene ring, at least one aldehyde, and at least one amine comprised of at least one primary or secondary amino group. In another embodiment, the at least one phenalkamine compound according to the invention comprises Mannich reaction products of cardanol, at least one aldehyde desirably selected from the group consisting of formaldehyde, paraformaldehyde, formalin, acetaldehyde, propionaldehyde and mixtures thereof; and at least one amine, preferably comprising a primary and/or secondary amino group.

Suitable alkylphenols useful in producing phenalkamine compounds include alkylphenols corresponding to the formula (IV):

R—Ar—OH  (IV)

wherein Ar is a benzene ring and R is a C6-C30 saturated or unsaturated alkyl group. R may be straight chain or branched. In one embodiment, R is comprised of from 1 to 4 carbon-carbon double bonds. In other embodiments, R is a straight chain C6-C30 unsaturated alkyl group. According to still further embodiments, R is —$C_{15}H_{31-x}$ and x is 0, 2, 4 or 6. Preferably, the —OH and —R substituents are ortho or para to each other on the benzene ring.

Cardanols are a particularly preferred type of alkylphenol. Any of the cardanol isomers can be used, either as pure compounds or as mixtures of different isomers. For example, one or more of saturated cardanol and/or mono-, di- and/or tri-unsaturated cardanols may be utilized as a starting material to prepare a phenalkamine compound useful in the present invention. Cardanols may be produced from Cashew Nutshell Liquid. As Cashew Nutshell Liquid is a non-food based renewable resource, this improves the sustainability of the inventive conversion coating compositions containing phenalkamines prepared from cardanol.

Other suitable types of alkylphenols including alkylphenols prepared by alkylation of phenol with relatively long chain alkenes (e.g., C6 to C30 alkenes), using catalysts and reaction conditions well known in the art. Examples of suitable alkylphenols of this type include, but are not limited to, heptylphenol, octylphenol, nonylphenol, decylphenol, dodecylphenol, tetradecylphenol, hexadecylphenol, octadecylphenol and the like (including isomers and mixtures thereof).

Suitable aldehydes useful in producing phenalkamine compounds include formaldehyde in particular (a preferred aldehyde, which may be utilized in the form of paraformaldehyde or formalin) as well as aliphatic aldehydes such as acetaldehyde and propionaldehyde. An aldehyde or mixture of aldehydes having the formula $R^5C$(═O)H, wherein $R^5$ is hydrogen (H) or an alkyl group (e.g., straight chain or branched) containing from 1 to 6 carbon atoms, may be employed.

Suitable amines useful in producing phenalkamine compounds include in particular aliphatic amines containing at least one primary or secondary amino group per molecule, including especially aliphatic polyamines (meaning aliphatic compounds comprising two or more amino groups per molecule, in particular two or more primary and/or secondary amino groups per molecule). In preferred embodiments, the amine comprises at least one primary amino group, even more preferably at least two primary amino groups, as well as, optionally, one or more secondary amino groups.

According to an aspect of the invention, the polyamines may be any amine having two or more primary amine functionalities, including compounds additionally having secondary amine functionalities in addition to the two or more primary amine groups. Suitable exemplary polyamines may be represented by the formula: H$_2$N—((—$R^1$—NH)$_m$—$R^2$—)$_n$-NH$_2$ wherein $R^1$ and $R^2$ are divalent hydrocarbyl groups, containing, for example, 2 to 20 carbon atoms, and m and n are integers ranging from 0 to 5, wherein m+n is equal to at least 1. The hydrocarbyl groups may be branched or linear alkylene groups, cycloaliphatic groups or contain aromatic groups, provided the attached amine groups are primary or secondary aliphatic amine groups (i.e., amine groups attached to aliphatic carbon atoms). In one embodiment, $R^1$ and $R^2$ are ethylene (—CH$_2$CH$_2$—). Accordingly, in one embodiment the amine corresponds to the formula H$_2$NCH$_2$CH$_2$(NHCH$_2$CH$_2$)$_n$NH$_2$, wherein n=0 or an integer of at least 1 (e.g., 1, 2, 3, 4, 5, 6, 7, 8, 9, 10 etc.). Mixtures of such amines may be reacted with the alkylphenol(s) and aldehyde(s).

Examples of suitable polyamines include, but are not limited to: ethyleneamines such as 1,2-ethanediamine (EDA, also known as ethylenediamine) and oligomers and polymers thereof (generally referred to as polyethylenepolyamines) such N-(2-aminoethyl)-1,2-ethanediamine (DETA, also known as diethylenetriamine), N,N-bis(2-amino-ethyl)-1,2-ethanediamine (TETA, also known as triethylenetetramine), and N-(2-aminoethyl)-N'-[(2-amino-ethyl)amino-ethyl]-1,2-ethanediamine (TEPA, also known as tetraethylenepentamine); aminoethylpiperazine; 1,3-benzenedimethanamine (MXDA-metaxylylene diamine); 1,3-cyclohexanedimethanamine (1,3-BAC); 1,2-diaminocyclohexane (DACH); norbornanediamine; isophorone diamine; 5-amino-1,3,3-trimethylcyclohexanemethanamine (IPDA); trimethylhexamethylenediamine (TMD); 1,3-pentanediamine; 2-methyl-1,5-pentanediamine; 1,6-hexanediamine (HMDA); 4,4'-diaminodicyclohexylmethane (PACM); alkyl monoamines having linear or branched alkyl chains, such as n-butylamine, tert-butylamine, n-pentylamine, n-hexylamine, 2-ethylhexylamine, n-octylamine; aromatic amines such as aniline, toluidine; alkylaromatic amines such as benzylamine; 1,2-propylenediamine; 1,3-propylenediamine; 1,4-butanediamine; 1,5-pentanediamine; 1,3-pentanediamine; 1,6-hexanediamine; 3,3,5-trimethyl-1,6-hexanediamine; 3,5,5-trimethyl-1,6-hexanediamine; 2-methyl-1,5-pentanediamine; bis (3-aminopropyl) amine; N,N'-bis (3-aminopropyl)-1,2-ethanediamine; N-(3-aminopropyl)-1,2-ethanediamine; 1,2-diaminocyclohexane; 1,3-diaminocyclohexane; 1,4-diaminocyclohexane; poly(alkylene oxide) diamines and triamines (such as the products sold under the brand name JEFFAMINE); phenylenediamine; 4,4'-diaminodiphenylmethane; toluenediamine; 3,3'-dimethyl-4,4'-diaminodicyclohexylmethane; 4,4'-diaminodicyclohexylmethane; 2,4'-diaminodicyclohexylmethane; 1,3-bis (aminomethyl) cyclohexane; and polyaminoamides.

Phenalkamine compounds suitable for use in the present invention are also readily available from commercial sources, such as Adarsh Industrial Chemicals, Cardolite Corporation, K2P Chemicals, Paladin Paints & Chemicals, and Royce International.

The inventive conversion coating compositions may be aqueous acidic solutions of Group IV metals and one or more phenalkamine compounds. Thus, the Group IV metal(s) are typically present in water-soluble form, e.g., in ionic form (through the use of water-soluble acids or salts of Group IV metals, including complex ions such as $ZrF_6^{-2}$). The conversion coating compositions are applied to reactive metal surfaces of substrates (preferably bare metal surfaces of substrates) through contacting the metal substrate with the conversion coating composition, e.g., spraying the conversion coating composition (which may be in the form of a solution or a dispersion) onto the metal substrate for a sufficient time and temperature to generate a conversion coating on the metal surfaces. Alternatively, the conversion coating compositions can be applied by dipping (immersion) or roll-coating.

The contact of the metal substrate with the aqueous acidic conversion coating compositions of Group IV metal(s) and phenalkamine compound(s) may result in several chemical reactions: oxidation of the substrate ($M^0 \rightarrow M^{n+} + ne^-$, M=Fe, Zn, Al), $H_2MF_6 + 2H_2O \rightarrow MO_2$ (i.e., Group IV metal oxide)+ 6HF (M=Ti, Zr, or Hf), wherein functionalities present in the phenalkamine compound(s), such as hydroxyl and amino functional groups) may bind to the substrate, substrate ions, or Group IV metal ions in solution or throughout the coating layer. A phenalkamine compound or mixture of phenalkamine compounds thus may be used as one component of a conversion coating deposition bath. It has been demonstrated that a conversion coating comprised of mixed Group IV metal oxides along with phenalkamine compound(s) and metal oxides of the substrate metal can be deposited on a metal substrate, whereby such deposited conversion coating imparts enhanced corrosion resistance and paint adhesion to the final painted part.

The inventive conversion coating composition containing Group IV metal(s) and phenalkamine compound(s) is capable of depositing phenalkamine compound(s) on metal substrates using typical conversion coating application methods (that is, the phenalkamine compound(s) is or are included in the coating layer formed on a metal substrate surface). The mixed conversion coating containing metal oxides and phenalkamine compound(s) provides improved corrosion resistance (including after the conversion-coated metal substrate has been painted). The present invention is useful in coating a broad range of metal substrates. Examples of suitable metal substrates include zinc; iron; aluminum; cold-rolled, ground, pickled, and hot-rolled steel; galvanized (including electrogalvanized and hot dip galvanized) steel; steel coated with zinc metal; zinc alloys; GALVALUME® (carbon steel sheet coated with hot-dip coating of 55% Al and 45% Zn); galvannealed steel; aluminum alloys; and aluminum-plate steel substrates. The conversion coating compositions of the present invention are particularly effective when applied to surfaces of aluminum and cold rolled steel (CRS) substrates. Mixed metal substrates, meaning substrates such as assemblies having surfaces of a first metal and second surfaces of a second metal different from the first, may also be conversion-coated in accordance with the present invention.

The incorporation of phenalkamine compounds into aqueous solutions of Group IV metal ions provides conversion coating compositions which, once deposited on a metal substrate surface, provide excellent E-coat paint adhesion without requiring the presence of added copper ions in the conversion coating composition. This allows for the elimination of copper ions from said conversion coating compositions, other than trace amounts of copper found in the water or other components of the conversion coating composition. Thus, in certain embodiments, the conversion coating composition and/or the as-deposited coating is free or essentially free of copper ions (preferably, less than 50, less than 40, less than 30, less than 20, less than 15, less than 10, less than 5, less than 2 or less than 1 ppm Cu ions).

Preferred phenalkamine compounds for use as described by the invention are produced from Cashew Nutshell Liquid. As Cashew Nutshell Liquid is a non-food based renewable resource, this improves the sustainability of related conversion coating products.

Low levels of phenalkamine compound in a conversion coating composition based on Group IV metal(s) are surprisingly effective at improving the corrosion resistance of conversion-coated metal substrates prepared using such conversion coating compositions.

The conversion coatings obtained from compositions containing Group IV metal and phenalkamine compound provide performance improvements in accelerated corrosion testing as compared to the current surface treatments, such as conversion coating compositions like Bonderite® M-NT 1820 (a product of Henkel Corporation).

The inventive compositions comprising Group IV metals and phenalkamine compounds have been shown to deposit a mixture of metal oxide(s) and phenalkamine compound(s) under acidic conditions and relatively short application times (as low as 2 minutes or less). In one embodiment, the conversion coatings may be deposited on reactive metal surfaces of substrates by contacting the metal substrate surfaces with the aqueous conversion coating composition according to the invention for approximately 2 minutes at a temperature of 24-40° C.

Contacting may be accomplished by any suitable means including but not limited to dipping (immersion), spraying, roll-coating and the like. Contact times and temperatures may be varied, but are typically less than 20 minutes, preferably less than 10 minutes, more preferably less than 5 minutes. Desirably, contact time is at least about 1, 3, 5, 10, 15, 20, 30, 40, 50 or 60 seconds and is no more than about 9, 8, 7, 6, 5, 4, 3 or 2 minutes. Suitable contact times may include, for example, 5 seconds to 20 minutes, 30 seconds to 5 minutes, and 1 minute to 15 minutes. Desirably, the temperature ranges from at least about 10, 11, 12, 13, 14, 15, 16, 17, 18, 19, 20, 21, 22, 23, 24, 25, 26, 27, 28, 29, 30, 31 or 32° C. and no more than about 70, 60, 50, 45, 40, 39, 38, 37, 36, 35, 34 or 33° C. Higher or lower temperatures, for example at least greater than the freezing point of the bath and up to 50° C., may be employed provided that they do not interfere with deposition of the conversion coating or negatively affect the metal pretreatment working bath or performance of the conversion coating. Suitable temperatures during contacting of the conversion coating composition with a metal substrate surface may include, for example, 10-70° C., 15-40° C. and 20-35° C.

The pH of the conversion coating composition as used (i.e., as contacted with the metal surface of a substrate) is preferably 5.0 or less as noted below. Other components of the base conversion coating composition may include: a positive amount of free fluoride at 100 ppm or less and nitrate at 3500 ppm or greater. The Group IV metal can be Zr, Ti, Hf or mixtures thereof, preferably Zr and/or Ti.

In certain embodiments, the conversion coating composition may optionally comprise at least on additional dissolved metal ion selected from zinc, manganese, magnesium, calcium, barium, strontium, aluminum, gallium and indium in particular dissolved zinc. The zinc ion is preferred in that particularly good adhesion is obtained. Concentration of the additional metal ion in the conversion coating composition ranges from about 1 ppm to about 5000 ppm; preferably, about 20 ppm to about 2000 ppm.

In still other embodiments, the conversion coating composition may additionally comprise one or more of the Si-based substances known in the conversion coating art, such as silanes, organosilanes, $SiO_2$, silicic acid esters, siloxanes, silicates and the like. These substances may be water-soluble or water-dispersible and, if present, their concentration may range from 1 ppm to about 5000 ppm provide that the conversion coating performance is not reduced.

Dissolved copper, preferably in an amount of up to 50 ppm, optionally may also be present. However, as previously noted, the conversion coating composition may be free or essentially free of dissolved Cu and still provide a conversion coating which is highly corrosion resistant.

The conversion coating compositions of the present invention additionally are comprised of water. Water is used to dilute and/or solubilize the other components of the conversion coating composition and thus can function as a carrier or solvent.

The conversion coating compositions of the present invention may, for example, comprise at least 5, 10, 15, 20, 25, 30, 35, 40, 45, 50, 55, 60, 65 or 70 ppm in total of phenalkamine compound but independently not more than 10,000, 9000, 8000, 7000, 6000, 5000, 4000, 3000, 2000, 1500, 1000, 500, 400, 375, 350, 325, 300, 275, 250, 225, 200, 175, 150, 125, 100, or 75 ppm in total of phenalkamine compound. According to certain preferred embodiments of the invention, the conversion coating composition is comprised of 40-120 ppm phenalkamine compound.

The conversion coating compositions of the present invention may, for example, comprise at least 20, 30, 40, 50, 60, 70, 80, 90 or 100 ppm of Group IV metal but independently not more than 1000, 750, 600, 500, 400, 375, 350, 325, 300, 275, 250, 225, 200, 175, 150, 125 ppm of Group IV metal. For example, the conversion coating composition may contain 50 to 750 ppm of Group IV metal (e.g., Zr, Ti and/or Hf). According to certain preferred embodiments, the conversion coating composition is comprised of 100 to 300 ppm Group IV metal (in particular, Zr, Ti, Hf or a combination of Zr and Ti).

The conversion coating compositions of the present invention may, for example, be free of added copper or may comprise 1, 2, 3, 4, 5, 6, 7, 8, 9, 10, 11 or 12 ppm of Cu but independently not more than 50, 40, 30, 25, 20 or 15 ppm of Cu.

The pH of the conversion coating compositions of the present invention may, for example, be at least 1.8, 2.0, 2.2, 2.4, 2.6, 2.8, 3.0, 3.2, 3.4 3.6, 3.7 or 3.8 but independently not more than 5.5, 5.0, 4.9, 4.8, 4.7, 4.6, 4.5, 4.4, 4.3 or 4.2. According to certain embodiments, the pH of the conversion coating composition is 1.8 to 5.0 or 3.8 to 4.5. The pH may be adjusted, for example, by the use of a Group IV metal acid, an acid fluoride, and/or other mineral acids such as nitric acid and sulfuric acid.

The conversion coating compositions of the present invention may, for example, comprise at least 10, 11, 12, 13, 14 or 15 ppm of free fluoride but independently not more than 100, 90, 80, 70, 60, 50 or 40 ppm of free fluoride. For example, the free fluoride content of the conversion coating composition may be 10 to 100 ppm or 15 to 40 ppm in various embodiments of the invention. Free fluoride may be provided from any suitable source, such as HF, KF, NaF or the like.

The conversion coating compositions of the present invention may, for example, comprise at least 3000, 3500, 4000, 4500, 5000, 5500, 6000, 6500 or 7000 ppm of nitrate but independently not more than 15,000, 14,000, 13,000, 12,000, 11,000, 10,500, 10,000, 9500, 9000, 8500 or 8000 ppm of nitrate.

The conversion coating compositions of the present invention may, for example, comprise an optional surfactant component in an amount of at least about 1 ppm up to solubility limits of the surfactant. The surfactant component may reduce surface tension and improve wetting of the metal surface as well as aiding solubilizing or dispersing the phenalkamine compounds. The surfactant component can include anionic surfactants, nonionic surfactants, cationic surfactants, amphoteric surfactants, zwitterionic surfactants, and mixtures thereof.

Exemplary nonionic surfactants that can be used in the surfactant component include alkoxylates, primary alcohol ethoxylates, amine oxides, salts of alkylamino acids such as sodium salts of alkylamino acids, and mixtures thereof. Examples of nonionic surfactants include those nonionic surfactants having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide-free non-ionics, such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; dodecyl, octyl or nonylphenol ethoxylates, polyoxyethylene glycol ethers and the like; carboxylic acid esters such as methyl esters, glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymers and the like; and other like nonionic compounds.

Examples of amine oxide surfactants include: dimethyldodecylamine oxide, dimethyltetradecylamine oxide; ethylmethyltetradecylamine oxide, cetyldimethylamine oxide, dimethylstearylamine oxide, cetylethylpropylamine oxide, diethyldodecylamine oxide, diethyltetradecylamine oxide, dipropyldodecylamine oxide, lauryl dimethyl amine oxide, bis-(2-hydroxyethyl)dodecylamine oxide, bis-(2-hydroxyethyl)-3-dodecoxy-1-hydroxypropyl amine oxide, (2-hydroxypropyl)methyltetradecylamine oxide, dimethylloleyamine oxide, dimethyl-(2-hydroxydodecyl)amine oxide, and the corresponding decyl, hexadecyl and octadecyl homologs of the above compounds.

Additional nitrogen-containing surfactants include ethoxylated primary alkyl amines where the alkyl group has 10-20 carbon atoms and the amine is ethoxylated with 2-20 ethylene oxide units. Further surfactants include ethoxylated long chain fatty acid amides where the fatty acid has 8-20 carbon atoms and the amide group is ethoxylated with 1-20 ethylene oxide units. Additionally, non-ionic surfactants derived from the condensation of ethylene oxide with the product resulting from the reaction of propylene oxide and ethylene diamine are also useful. Other surfactants can be used in the compositions of this invention other than or in addition to the above described surfactants. Suitable non-ionic surfactants include the polyoxyethylene-polyoxypropylene condensates, which are sold by BASF under the trade name "Pluronic®", polyoxyethylene condensates of aliphatic alcohols/ethylene oxide condensates having from 1 to 30 moles of ethylene oxide per mole of coconut alcohol; ethoxylated long chain alcohols sold by Shell Chemical Co. under the trade name "Neodol®", polyoxyethylene condensates of sorbitan fatty acids, alkanolamides, such as the monoalkoanolamides, dialkanolamides and the ethoxylated alkanolamides, for example coconut monoethanolamide, lauric isopropanolamide and lauric diethanolamide; and amine oxides for example dodecyldimethylamine oxide. Further exemplary non-ionic surfactants include alcohol alkoxylates, alkylphenol alkoxylates, and amine oxides such as alkyl dimethylamine oxide or bis(2-hydroxyethyl)alkylamine oxide.

Exemplary nonionic surfactants that can be used include alkoxylates. The alkoxylates can be alkoxylates having a mixture of different alkoxy repeating units. The alkoxylates can be alcohol ethoxylate/propoxylate polymers.

Exemplary anionic surfactants that can be used include organic carboxylates, organic sulfonates, organic sulfates, organic phosphates and the like, particularly linear alkylaryl sulfonates, such as alkylarylcarboxylates, alkylarylsulfonates, alkylarylphosphates, and the like. These classes of anionic surfactants are known within the surfactant art as linear alkyl benzyl sulfonates (LABS), alpha olefin sulfonates (AOS), alkyl sulfates, and secondary alkane sulfonates.

Exemplary cationic surfactants that can be used include for example ammonium cationic surfactants as are known in the art having a quaternary nitrogen with four substituent R groups which can be each independently hydrogen, C1-C10 alkyl, C1-C10 alkoxy, or phenyl; and a counterion $X^-$. The counterion, $X^-$, may be any anion compatible with the composition. Suitable anions include anion of low molecular weight acids, such as chloride, bromide, iodide, sulfate, sulfonate, acetate, nitrate, nitrite, phosphate, and the like.

Examples of suitable amphoteric surfactants include capryloamphopropionate, disodium lauryl B-iminodipropionate, and cocoamphocarboxypropionate, and disodium octylimino dipropionate.

Although phosphate functional groups may be present in the surfactant component described above, it is preferable that the conversion coating compositions and as-deposited coatings are preferably free of phosphate ions and/or metal phosphate salts or have substantially no phosphate ions and/or metal phosphate salts, for example in a range of 1, 2, 3, 4, 5, 6, 7, 8, 9, 10, 11 or 12 ppm of phosphate ions and/or metal phosphate salts but independently not more than 50, 40, 30, 25, 20 or 15 ppm phosphate ions and/or metal phosphate salts.

The conversion coating composition typically does not require the presence of an accelerator due to relatively quick deposition, as shown by the examples which contain no accelerator. If desired, although not preferred, one or more coating accelerators in amounts of 1 to 5000 ppm may be included such as peroxides, iron (III) ions, nitrite ions, hydroxylamine, persulfate ions, sulfite ions, hyposulfite ions, carboxylic acids and halogen-based ions.

According to one embodiment of the invention, the conversion coating composition is supplied as a ready to use formulation; that is, sufficient water is provided to achieve the desired concentration of the Group IV metal(s), phenalkamine compound(s) and other (optional) components of the conversion coating composition when the conversion coating composition is to be contacted with a metal surface of a substrate under conditions effective to form a conversion coating on such surface. However, it is also possible to formulate the conversion coating composition as a concentrate, for ease of shipping and storage, which is then simply diluted with water by an end-user to an appropriate or desired concentration when conversion-coating a metal substrate surface.

After contacting a metal substrate surface with a conversion coating composition in accordance with the present invention, the conversion-coated metal substrate may optionally be rinsed, for example with water and/or with a post-rinse solution or dispersion (sometimes referred to in the art as a "sealer") which further enhances the corrosion resistance of the conversion-coated metal substrate surface. Following rinsing and/or sealing, the conversion coated metal substrate may be dried, using any suitable method.

In a typical industrial process, it is advantageous that the present process allows for the Group WB metal containing pretreatment to be applied directly to bare metal substrates just before primers and or paints are applied to the substrates.

The present Group IVB metal pretreatment compositions containing the phenalkamine may be applied in a wet on wet process, meaning they are applied to a substrate and then subsequent layers are applied without rinsing or drying the substrate after deposition of the Group IVB metal oxide coating. The present inventive Group IVB metal oxide coatings can be dried after application if desired, but this is not necessary. These coatings are typically applied to substrates using a bath of the coating material and dipping the substrate into the bath for a given period of time at a given temperature and then transferring the substrate to the next coating bath. Prior to application of the Group IVB metal oxide coatings, the substrates are cleaned and/or degreased and rinsed. The inventive Group IVB metal containing pretreatment compositions according to the invention can also be applied by spraying, roller application and any other application method providing desired coating weight of the Group IVB metal oxide coatings.

Typically, conversion coating of a metal substrate surface using a conversion coating composition in accordance with the present invention provides a conversion coating layer on the metal substrate surface having a thickness of from about 25 to about 75 nm. Typical coating weights for such a conversion coating are about 25 to about 200 $mg/m^2$.

Exemplary Parameters

The following parameters (Table 1) may be practiced in various preferred embodiments of the present invention. As used herein, the term "pretreatment stage" means a step wherein a metal surface of a substrate is contacted with a conversion coating composition to form a conversion coating on a metal surface of the substrate.

TABLE 1

| Parameter | Preferred | More Preferred |
|---|---|---|
| Phenalkamine compound concentration (by weight) in concentrate product as delivered prior to preparation of working conversion coating composition | 0.25-50% | 1-20% |
| Concentration of phenalkamine compound(s) (by weight) in conversion coating composition (pretreatment stage) | 5-10,000 ppm | 5-500 ppm |
| Zr concentration (by weight) in conversion coating composition (pretreatment stage) | 50-750 ppm | 100-200 ppm |
| Ti concentration (by weight) in conversion coating composition (pretreatment stage) | 50-750 ppm | 50-200 ppm |
| Cu concentration (by weight) in conversion coating composition (pretreatment stage) | 0-50 ppm | 0-15 ppm |
| pH of conversion coating composition (pretreatment stage) | 1.8-5.0 | 3.8-4.5 |
| Free fluoride concentration (by weight) in conversion coating composition (pretreatment stage) | 10-100 ppm | 15-40 ppm |
| Nitrate concentration (by weight) in conversion coating composition (pretreatment stage) | >3500 ppm | 4000-8000 ppm |

Application of Additional Coatings

Following conversion coating and, optionally, one or more post-rinsing (or "sealing") and/or drying steps, the metal substrate may be subjected to one or more further processing steps, including in particular the application of a paint or other decorative and/or protective coating. In such applications, the conversion coating may function as a primer or anti-corrosion layer. Any such coating known in the art may be employed, including for example, electrophoretic coatings (E-coatings), solvent-borne paints, aqueous-borne paints, powder coatings and the like. Conversion-coated surfaces in accordance with the present invention may be painted or otherwise further coated using any of the standard painting or other coating techniques known in the art such as brush painting, spray painting, electro-static coating, dip coating, roller coating or electrocoating. As a result of the conversion coating pretreatment of the present invention, the painted or coated surface of the metal substrate has improved paint/coating adhesion and corrosion resistance characteristics.

Accordingly, the present invention may be practiced in accordance with the following exemplary multi-step process:

1) optionally, cleaning of a metal surface of a substrate;
2) optionally, rinsing of the cleaned metal substrate surface;
3) conversion coating of the cleaned and rinsed metal substrate surface;
4) optionally, rinsing of the conversion-coated metal substrate surface with water and/or sealing of the conversion-coated metal substrate surface with a post-rinse solution or dispersion;
5) electrophoretic coating of the optionally rinsed and/or sealed conversion-coated metal substrate surface;
6) rinsing of the electrophoretic-coated metal substrate surface with water; and
7) baking of the rinsed electrophoretic-coated metal substrate.

Prior to a conversion coating step utilizing a conversion coating composition in accordance with the present invention, a metal surface of a substrate may be cleaned using any method known in the art for removing contaminants from the metal surface of a substrate, such as spraying with an alkaline cleaner. The metal substrate surface may also be rinsed prior to conversion coating, either with water alone or with a pre-rinse solution comprising one or more substances capable of further improving the corrosion resistance of the conversion coating subsequently formed on the metal substrate surface. So-called pre-conditioning treatments may be employed, but coating processes in the absence of a pre-conditioning step are preferred.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of a composition, article or process. Additionally, in some embodiments, the invention can be construed as excluding any element or process step not specified herein.

Although the invention is illustrated and described herein with reference to specific embodiments, the invention is not intended to be limited to the details shown. In the experiments disclosed in the present specification an exemplary zirconium oxide containing coating was used as the base or control anti-corrosion coating. It was deposited by contact with a hexafluorozirconic acid containing treatment. It is but one example of a pretreatment that can benefit from the present invention. Rather, various modifications may be made in the details within the scope and range of equivalents of the claims and without departing from the invention.

EXAMPLES

The following procedures were used to prepare various types of coated substrates for testing.

Panel Coating Process (Process 1):
Bonderite® C-AK T51 (2% v/v, 49° C., FA 5.0, 90 second spray, 10 psi)
Rinse: City Water (38° C., 60 second spray, 10 psi)
Rinse: DI Water (24° C., 60 second spray, 10 psi)
Conversion Coating: 32° C., 120 seconds immersion Rinse: DI Water (24° C., 60 seconds spray, 10 psi)
Ecoat: BASF CathoGuard® 800 (35° C., 134 second immersion, 230V)
Rinse: DI Water (24° C., 60 seconds spray, 10 psi)
Paint Cure: Oven bake (182° C., 35 minutes)
Spray Coil Process (Process 2):
  Bonderite® C-IC 243 (5% v/v, 60° C., 10 second spray, 10 psi)
  Rinse: City Water (60° C., 10 second spray, 10 psi)
  Rinse: DI Water (60° C., 10 second spray, 10 psi)
  Conversion Coating: 60° C., 6 seconds spray
  Squeegee rolls: pass-through to remove excess
  Rinse: DI Water (60° C., 10 second spray, 10 psi)
Immersion Coil Process (Process 3):
  Bonderite® C-IC 243 (5% v/v, 60° C., 10 second spray, 10 psi)
  Rinse: City Water (60° C., 10 second spray, 10 psi)
  Rinse: DI Water (60° C., 10 second spray, 10 psi)
  Conversion Coating: 60° C., 20 seconds immersion
  Rinse: DI Water (60° C., 10 second spray, 10 psi)
Paint Application (Process 4):
  PMW 3659 TWK30 White (Valspar)
  Draw-down bar #26
  Bake: 25 seconds @227° C.
  Dry Film Thickness: 0.7 mils For each Example, unless stated otherwise, the Control for the Example has the same composition (make-up) as the phenalkamine-containing conversion coating composition but lacks the phenalkamine additive.

Example 1

Phenalkamine was incorporated into Bonderite® M-NT 1820, a zirconium oxide-depositing pretreatment solution commercially available from Henkel Corporation, at a concentration of 50 ppm to obtain a Group IV metal oxide-depositing aqueous pretreatment composition in accordance with the present invention. Bonderite® M-NT 1820 solution was prepared as outlined in the supplier's (Henkel Corporation's) Technical Product Bulletin. Half was retained as a control and phenalkamine was then added to the other half of the Bonderite® M-NT 1820 solution (Ex. 1A). Bath parameters were maintained as follows: Zr=150 ppm, Cu=10 ppm, Free F=20 ppm, pH=4.00, Temperature=32° C. The solutions were used to coat ACT CRS and Aluminum A16HS1T4 panels in accordance with Process 1 and these panels were subsequently painted with BASF CathoGuard® 800. One set of CRS panels was tested using a 10-day hot salt water soak at 5% NaCl and 55° C. The resulting creep from scribe is shown in Table 2.

TABLE 2

| Candidate | CRS |
|---|---|
| Comparative Pretreatment 1: phenalkamine-free $ZrO_2$-depositing pretreatment, Bonderite ® M-NT 1820 | 3.1 |
| Ex. 1A: $ZrO_2$-depositing pretreatment (50 ppm phenalkamine) | 1.3 |

Corrosion in mm from creep, U/2 (3 replicates)

The amount of corrosion observed in the CRS panels conversion-coated with the phenalkamine-containing composition was less than 50% of the value for the control.

The paint adhesion of a second set of test panels (CRS and Al panels) was evaluated using GMW14829/14704. The results are shown in Table 3.

TABLE 3

| Candidate | Initial | Post 24 Hr. Water Soak | Post 48 Hr. Water Soak |
|---|---|---|---|
| Comp. Ex. 1B: Comp. Pretreatment 1 on CRS | 100 | 100 | 98-100 |
| Ex. 1B: $ZrO_2$-depositing pretreatment (50 ppm phenalkamine) on CRS | 100 | 100 | 100 |
| Comp. Ex. 1C: Comp. Pretreatment 1 on Al | 100 | 100 | 100 |
| Ex. 1C: $ZrO_2$-depositing pretreatment (50 ppm phenalkamine) on Al | 100 | 100 | 100 |

% Paint Remaining (2 replicates each)

The presence of phenalkamine in the conversion coating composition did not reduce the paint adhesion performance of the test panels.

The filiform corrosion on a third set of conversion-coated Al panels (Al6HS1T4) was evaluated using GM9682P. The results are shown in Table 4.

TABLE 4

| Candidate | Max. | Avg. |
|---|---|---|
| Comp. Ex. 1D: Comp. Pretreatment 1 on Al | 7.5 | 4.8 |
| Ex. 1D: $ZrO_2$-depositing pretreatment (50 ppm phenalkamine) on Al | 6.2 | 3.7 |

Corrosion - filament length, mm

Example 2

Phenalkamine was incorporated into a copper-free zirconium oxide-depositing pretreatment solution at a concentration of 50 ppm; a phenalkamine-free sample of the solution was retained for comparison. The conversion coating composition parameters for both samples were maintained as follows: Zr=150 ppm, Cu=0 ppm, Free F=20 ppm, pH=4.00, Temperature=32° C. The solutions were used to coat ACT CRS and Aluminum Al6HS1T4 panels in accordance with Process 1 and these panels were subsequently painted with BASF CathoGuard® 800. One set of CRS panels was tested using a 10-day hot salt water soak at 5% NaCl and 55° C. The resulting creep from scribe is shown in Table 5.

TABLE 5

| Candidate | CRS |
|---|---|
| Comparative Pretreatment 2: Copper-free, phenalkamine-free $ZrO_2$-depositing pretreatment | 3.9 |
| Ex. 2A: Copper-free $ZrO_2$-depositing pretreatment (50 ppm phenalkamine) | 0.9 |

Corrosion in mm from creep, U/2 (3 replicates)

The same treatment solutions were used to coat a second set of CRS panels and Al (A16HS1T4) panels. The paint adhesion of these panels was evaluated using GMW14829/14704. Table 6 shows the results.

TABLE 6

| Candidate | Initial | Post 24 Hr. Water Soak | Post 48 Hr. Water Soak |
|---|---|---|---|
| Comp. Ex. 2B: Comp. Pretreatment 2 on CRS | 100 | 85-90 | 30-90 |
| Ex. 2B: Copper-free $ZrO_2$-depositing pretreatment (50 ppm phenalkamine) on CRS | 100 | 100 | 100 |
| Comp. Ex. 2C: Comp. Pretreatment 2 on Al | 100 | 100 | 100 |

TABLE 6-continued

| Candidate | Initial | Post 24 Hr. Water Soak | Post 48 Hr. Water Soak |
|---|---|---|---|
| Ex. 2C: Copper-free ZrO$_2$-depositing pretreatment (50 ppm phenalkamine) on Al | 100 | 100 | 100 |

% Paint Remaining (2 replicates each)

Notably, paint adhesion of the Cu-free control was poor after 48 hours whereas 100% adhesion of the paint to panels treated with a conversion coating composition in accordance with the present invention was observed on both CRS and Al.

Example 3

Example 3 was performed according to Example 1, except that 10 ppm additional Cu was present in the conversion coating composition to a total of 20 ppm Cu. Table 7 shows the resulting creep from scribe.

TABLE 7

| Candidate | CRS |
|---|---|
| Comparative Pretreatment 3: Phenalkamine-free ZrO$_2$-depositing pretreatment (20 ppm copper) | 4.1 |
| Ex. 3A: ZrO$_2$-depositing pretreatment (50 ppm phenalkamine and 20 ppm copper) | 1.7 |

Corrosion in mm from creep, U/2 (3 replicates)

The improvement in corrosion resistance was more than double using a conversion coating composition in accordance with the present invention.

The same treatment solution was used to coat CRS & Al6HS1T4. The paint adhesion of these panels was evaluated using GMW14829/14704. The results obtained are shown in Table 8.

TABLE 8

| Candidate | Initial | Post 24 Hr. Water Soak | Post 48 Hr. Water Soak |
|---|---|---|---|
| Comp. Ex. 3B: Comp. Pretreatment 3 on CRS | 100 | 75-90 | 75-85 |
| Ex. 3B: ZrO$_2$-depositing pretreatment (50 ppm phenalkamine and 20 ppm copper) on CRS | 100 | 100 | 100 |
| Comp. Ex. 3C: Comp. Pretreatment 3 on Al | 100 | 100 | 100 |
| Ex. 3C: ZrO$_2$-depositing pretreatment (50 ppm phenalkamine and 20 ppm copper) on Al | 100 | 100 | 100 |

% Paint Remaining (2 replicates each)

The Control had reduced adhesion at 24 and 48 hours on CRS, as compared to the results obtained using a conversion coating composition in accordance with the present invention.

The filiform corrosion on a third set of conversion-coated Al panels (Al6HS1T4) was evaluated using GM9682P. The results obtained are shown in Table 9.

TABLE 9

| Candidate | Max. | Avg. |
|---|---|---|
| Comp. Ex. 3D: Comp. Pretreatment 3 on Al | 7.8 | 5.1 |
| Ex. 3D: ZrO$_2$-depositing pretreatment (50 ppm phenalkamine and 20 ppm copper) on Al | 7.0 | 4.7 |

Corrosion - filament length, mm

The conversion coating composition containing phenalkamine showed improved filiform corrosion resistance compared to the Control.

Example 4

Phenalkamine was incorporated into a zirconium oxide/titanium oxide-depositing pretreatment solution at a concentration of 100 ppm; a phenalkamine-free sample of the solution was retained for comparison. The conversion coating composition parameters were maintained as follows: Zr=75 ppm, Ti=150 ppm, pH<2.00, Temperature=60° C. The solutions were used to coat Aluminum Al6HS1T4 panels using a spray coil process (Process 2) and these panels were subsequently painted (according to Process 4) with Valspar polyester paint.

The filiform corrosion on the conversion-coated Al6HS1T4 panels was evaluated using GM9682P. Table 10 shows the results obtained.

TABLE 10

| Candidate | Max. | Avg. |
|---|---|---|
| Comparative Pretreatment 4: ZrO$_2$-/TiO$_2$- depositing pretreatment | 5.1 | 3.0 |
| Ex. 4A: ZrO$_2$-/TiO$_2$- depositing pretreatment (100 ppm phenalkamine) | 2.9 | 1.6 |

Corrosion - filament length, mm

Example 5

The conversion coating compositions used in Example 5 were made according to Example 1. The solutions were used to coat Aluminum Al6HS1T4 panels using an immersion coil process (Process 3) and these panels were subsequently painted with Valspar polyester paint in accordance with Process 4.

The filiform corrosion on conversion-coated Aluminum Al6HS1T4 panels was evaluated using GM9682P. The results obtained are shown in Table 11.

TABLE 11

| Candidate | Max. | Avg. |
|---|---|---|
| Comparative Pretreatment 5: Bonderite® M-NT 1820 | 6.7 | 4.8 |
| Ex. 5A: ZrO$_2$-depositing pretreatment (50 ppm phenalkamine) | 2.9 | 1.5 |

Corrosion - filament length, mm

The same pretreatment solutions were used to coat another set of Aluminum Al6HS1T4 panels and then lap-shear structural bonds were prepared on the conversion-coated panels using Teroson® 5089 structural adhesive, commercially available from Henkel Corporation, to test adhesion of the conversion coating. Two 1"×4" metal panels are used for each lap shear test specimen. Henkel Teroson® 5089 was applied per manufacturer instructions and ASTM D1002. Test specimens were cured at 170° C. for 20 minutes and allowed to cool for a minimum of 2 hours before further testing. These adhesive bonded test specimens were then exposed to corrosion testing according to ASTM G85, Annex 2 for 240 hours. The resulting bond strength was determined according to ASTM D1002 by applying tensile force to the bonds using an Instron® tensile strength test device. The results obtained are shown in Table 12.

TABLE 12

| Candidate | Avg. (MPa) |
|---|---|
| Comp. Ex. 5A: Comp. Pretreatment 5 | 14.1 |
| Ex. 5A: ZrO$_2$-depositing pretreatment (50 ppm phenalkamine) | 15.8 |

Average bond strength, MPa

Adhesion to the panels coated with the phenalkamine-containing conversion coating composition in accordance with the present invention was approximately 10% improved as compared to the Control.

Comparative Example 1

Polyethyleneimine was incorporated into a zirconium oxide depositing pretreatment solution of Bonderite® M-NT 1820 at a concentration of 58 ppm. The Bonderite® M-NT 1820 solution was prepared as outlined in the supplier's (Henkel Corporation's) Technical Product Bulletin. The polyethyleneimine was then added to the Bonderite® M-NT 1820 solution and the parameters were maintained as follows: Zr=150 ppm, Cu=10 ppm, Free F=20 ppm, pH=4.00, Temperature=32° C. This solution was used to coat ACT CRS panels in accordance with Process 1 and these panels were subsequently painted with BASF CathoGuard® 800. These panels were tested using a 10-day hot salt water soak at 5% NaCl and 55° C. The resulting creep from scribe is shown in Table 13. The tables below include test results for Comparative Pretreatment 1 and results from the Control and the Inventive Example 1A from Example 1 for comparison.

TABLE 13

| Candidate | CRS |
|---|---|
| Comparative Pretreatment 1: Bonderite ® M-NT 1820 | 3.1 |
| Comparative Example #1: ZrO$_2$-depositing pretreatment (58 ppm polyethyleneimine) | 5.6 |
| Ex. 1A: ZrO$_2$-depositing pretreatment (50 ppm phenalkamine) | 1.3 |

Corrosion in mm from creep, U/2 (3 replicates)

The paint adhesion of these panels was evaluated using GMW14829/14704. Table 14 shows the results obtained.

TABLE 14

| Candidate | Initial | Post 24 Hr. Water Soak | Post 48 Hr. Water Soak |
|---|---|---|---|
| Comparative Pretreatment 1: Bonderite ® M-NT 1820 on CRS | 100 | 100 | 98-100 |
| Comparative Example #1: ZrO$_2$-depositing pretreatment (58 ppm polyethyleneimine) on CRS | 100 | 95-99 | 95-99 |
| Ex. 1A: ZrO$_2$-depositing pretreatment (50 ppm phenalkamine) on CRS | 100 | 100 | 100 |

% Paint Remaining (2 replicates each)

These results show that Comparative Example #1 does not perform as well as Inventive Example 1a.

Comparative Example #2

Comparative Example #2 was performed according to Example 3, except that 58 ppm polyethyleneimine was used in place of the 50 ppm of phenalkamine. This solution was used to coat ACT CRS panels and these panels were subsequently painted with BASF CathoGuard® 800. These panels were tested using a 10-day hot salt water soak at 5% NaCl and 55° C.

The resulting creep from scribe is shown in Table 15. The tables below include test results from Comparative Example #2 as well as results from Example #3 (Comparative Pretreatment 3) and Inventive Example 3A for comparison.

TABLE 15

| Candidate | CRS |
|---|---|
| Comparative Pretreatment 3: Phenalkamine-free ZrO$_2$-depositing pretreatment (20 ppm copper) | 4.1 |
| Comparative Example #2: Phenalkamine-free ZrO$_2$-depositing pretreatment (58 ppm polyethyleneimine and 20 ppm copper) | 4.1 |
| Ex. 3A: ZrO$_2$-depositing pretreatment (50 ppm phenalkamine and 20 ppm copper) | 1.7 |

Corrosion in mm from creep, U/2 (3 replicates)

The paint adhesion of these panels was evaluated using GMW14829/14704. The results obtained are shown in Table 16.

TABLE 16

| Candidate | Initial | Post 24 Hr. Water Soak | Post 48 Hr. Water Soak |
|---|---|---|---|
| Comparative Pretreatment 3: Phenalkamine-free ZrO$_2$-depositing pretreatment (20 ppm copper) | 100 | 75-90 | 75-85 |
| Comparative Example #2: Phenalkamine-free ZrO$_2$-depositing pretreatment (58 ppm polyethyleneimine and 20 ppm copper) | 100 | 95 | 95 |
| Ex. 3A: ZrO$_2$-depositing pretreatment (50 ppm phenalkamine and 20 ppm copper) | 100 | 100 | 100 |

% Paint Remaining (2 replicates each)

These results demonstrate that Comparative Example #2 does not perform as well as Inventive Example 3A.

Comparative Example #3

The following materials: polyamide (Nylon), imidazoline polyamide, and poly (5-vinyl-2-hydroxy-)-n-benzyl-N-methylgluconate were each incorporated into separate test samples of a zirconium oxide-/titanium oxide-depositing pretreatment solution at the concentrations specified in the table below. The conversion coating solution was prepared by adding hexafluorozirconic acid and hexafluorotitanic acid to distilled water; an additive-free sample of the solution was retained as a control. The candidate materials were then each separately added to separate test samples of the solution and the parameters were maintained as follows: Zr=75 ppm; Ti=150 ppm, pH<2.00, Temperature=60° C. These solutions were used to coat sets of Aluminum Al6HS1T4 panels using a spray coil process (according to Process 2) and these panels were subsequently painted with Valspar polyester paint (according to Process 4).

The filiform corrosion on Al6HS1T4 panels was evaluated using GM9682P. The results obtained are shown in Table 17. The table below includes test results from Inventive Example 4A for comparison.

TABLE 17

| Candidate Additive to ZrO$_2$-/TiO$_2$- depositing pretreatment | Max. | Avg. |
|---|---|---|
| Control: No additive | 7.8 | 4.9 |
| Polyamide (AQ Nylon P-95 at 1000 ppm) | 6.4 | 3.9 |
| Imidazoline polyamide (Ancamid ® 375A at 1000 ppm) | 7.9 | 6.0 |
| Glycol Uril resin (Cymel ® 1172 at 100 ppm) | 6.1 | 4.6 |
| Poly (5-vinyl-2-hydroxy-)-n-benzyl-N-methyl-gluconate (600 ppm) | 6.5 | 2.6 |
| Ex. 4A: ZrO$_2$-/TiO$_2$- depositing pretreatment (100 ppm phenalkamine) | 2.9 | 1.6 |

Corrosion - filament length, mm

The phenalkamine composition according to the invention showed a clear improvement in corrosion resistance as compared to the control as well as other nitrogen containing polymeric materials, which were used in amounts of as much as 10× the amount of phenalkamine.

As those skilled in the art will appreciate, numerous modifications and variations of the present invention are possible in light of these teachings, and all such are contemplated hereby. All references cited herein are incorporated by reference herein, at least for their teachings in the context presented.

What is claimed is:

1. An acidic aqueous conversion coating composition comprising:
   a) at least one Group IV metal; and
   b) at least one phenalkamine component wherein the at least one phenalkamine component comprises a mixture of at least two phenalkamine compounds, different from each other, each corresponding to Formula (I):

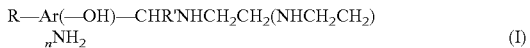

wherein Ar is a benzene ring, and for each of the different phenalkamine compounds R is a C6-C30 saturated or unsaturated alkyl group, R' is H or an alkyl group, and n is 0 or an integer of at least 1.

2. The acidic aqueous conversion coating composition of claim 1, wherein each R is a C6-C30 unsaturated alkyl group.

3. The acidic aqueous conversion coating composition of claim 1, wherein each R is comprised of from 1 to 4 carbon-carbon double bonds.

4. The acidic aqueous conversion coating composition of claim 1, wherein each R is a straight chain C6-C30 unsaturated alkyl group.

5. The acidic aqueous conversion coating composition of claim 1, wherein for one or more of the at least two phenalkamine compounds, different from each other, R is —C$_{15}$H$_{31-x}$ and x is 0, 2, 4 or 6.

6. The acidic aqueous conversion coating composition of claim 1, wherein n is 0, 1, 2, or 3.

7. The acidic aqueous conversion coating composition of claim 1, where R' is a C1-C6 alkyl group.

8. The acidic aqueous conversion coating composition of claim 1, wherein the at least one phenalkamine component comprises at least one phenalkamine compound which is a Mannich reaction product of at least one alkylphenol having at least one C6-C30 saturated or unsaturated alkyl group substituted on a benzene ring, at least one aldehyde, and at least one amine comprised of at least one primary or secondary amino group.

9. The acidic aqueous conversion coating composition of claim 8, wherein the at least one alkylphenol comprises at least two unsaturated isomers of cardanol.

10. The acidic aqueous conversion coating composition of claim 8, wherein the at least one aldehyde comprises formaldehyde or paraformaldehyde.

11. The acidic aqueous conversion coating composition of claim 8, wherein the at least one amine comprises at least one polyamine.

12. The acidic aqueous conversion coating composition of claim 8, wherein the at least one amine comprises at least one of ethylenediamine or a polyethylenepolyamine.

13. The acidic aqueous conversion coating composition of claim 1, additionally comprising one or more additional components selected from the group consisting of copper, free fluoride, zinc, nitrate and Si-based substances.

14. The acidic aqueous conversion coating composition of claim 1, wherein the acidic aqueous conversion coating composition has a pH of 5.0 or less.

15. The acidic aqueous conversion coating composition of claim 1, wherein the at least one phenalkamine component is present in a total concentration of from 5 to 10,000 ppm.

16. The acidic aqueous conversion coating composition of claim 1, wherein the at least one Group IV metal is present in a total concentration of from 50 to 750 ppm.

17. The acidic aqueous conversion coating composition of claim 1, wherein the at least one Group IV metal is present in a total concentration of from 50 to 750 ppm, the at least one phenalkamine component is present in a total concentration of from 5 to 10,000 ppm and total amount of phosphate ions and/or metal phosphate salts is not more than 50 ppm.

18. The acidic aqueous conversion coating composition of claim 1, wherein R is unsaturated.

19. A method of conversion-coating a substrate having a metal surface, comprising a step of contacting the metal surface of the substrate with the acidic aqueous conversion coating composition of claim 1.

20. A substrate having a bare metal surface comprising a conversion coating deposited thereon, wherein the conversion coating is comprised of at least one Group IV metal oxide, metal oxides of the substrate metal and at least one phenalkamine compound, wherein the at least one phenalkamine compound is derived from a compound corresponding to Formula (I):

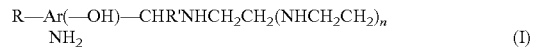

wherein Ar is a benzene ring, R is a C6-C30 saturated or unsaturated alkyl group, R' is H or an alkyl group, and n is an integer of at least 1.

21. An acidic aqueous conversion coating composition comprising:
   a) at least one Group IV metal; and
   b) at least one phenalkamine component wherein the at least one phenalkamine component comprises a mixture of at least two phenalkamine compounds, different from each other, each corresponding to Formula (I):

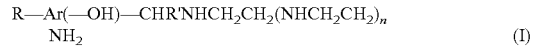

wherein Ar is a benzene ring, and for each of the different phenalkamine compounds R is a C6-C30 saturated or unsaturated alkyl group, R' is H or an alkyl group, and n is 0 or an integer of at least 1, wherein the mixture comprises a phenalkamine compound wherein —OH and —CHR'NHCH$_2$CH$_2$ (NHCH$_2$CH$_2$)$_n$NH$_2$ are ortho to each other on the benzene ring, —OH and R are meta to each other and the R is a straight chain hydrocarbyl of 12 to 18 carbon atoms comprising 1-4 carbon-carbon double bonds.

22. The acidic aqueous conversion coating composition of claim 21, wherein each R is a C6-C30 unsaturated alkyl group.

23. The acidic aqueous conversion coating composition of claim 21, wherein for one or more of the at least two phenalkamine compounds, different from each other, R is —$C_{15}H_{31-x}$ and x is 0, 2, 4 or 6.

24. The acidic aqueous conversion coating composition of claim 21, wherein n is 0, 1, 2, or 3.

25. The acidic aqueous conversion coating composition of claim 21, where R' is a C1-C6 alkyl group.

26. The acidic aqueous conversion coating composition of claim 21, wherein the at least one phenalkamine component comprises at least one phenalkamine compound which is a Mannich reaction product of at least one alkylphenol having at least one C6-C30 saturated or unsaturated alkyl group substituted on a benzene ring, at least one aldehyde, and at least one amine comprised of at least one primary or secondary amino group.

27. The acidic aqueous conversion coating composition of claim 26, wherein the at least one alkylphenol comprises at least two unsaturated isomers of cardanol.

28. The acidic aqueous conversion coating composition of claim 21, additionally comprising one or more additional components selected from the group consisting of copper, free fluoride, zinc, nitrate and Si-based substances.

29. The acidic aqueous conversion coating composition of claim 21, wherein the acidic aqueous conversion coating composition has a pH of 5.0 or less.

30. The acidic aqueous conversion coating composition of claim 21, wherein the at least one phenalkamine component is present in a total concentration of from 5 to 10,000 ppm.

31. The acidic aqueous conversion coating composition of claim 21, wherein the at least one Group IV metal is present in a total concentration of from 50 to 750 ppm.

32. The acidic aqueous conversion coating composition of claim 21, wherein the at least one Group IV metal is present in a total concentration of from 50 to 750 ppm, the at least one phenalkamine component is present in a total concentration of from 5 to 10,000 ppm and total amount of phosphate ions and/or metal phosphate salts is not more than 50 ppm.

33. The acidic aqueous conversion coating composition of claim 21, wherein R is unsaturated.

34. A method of conversion-coating a substrate having a metal surface, comprising a step of contacting the metal surface of the substrate with the acidic aqueous conversion coating composition of claim 21.

35. An acidic aqueous conversion coating composition comprising:
a) at least one Group IV metal; and
b) at least one phenalkamine component wherein the at least one phenalkamine component comprises a mixture of at least two phenalkamine compounds, different from each other, each corresponding to Formula (I):

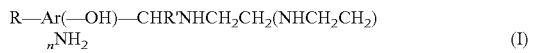

wherein Ar is a benzene ring, and for each of the different phenalkamine compounds R is a C6-C30 saturated or unsaturated alkyl group, R' is H or an alkyl group, and n is 0 or an integer of at least 1, wherein the at least one phenalkamine component includes a compound represented by Formula (II):

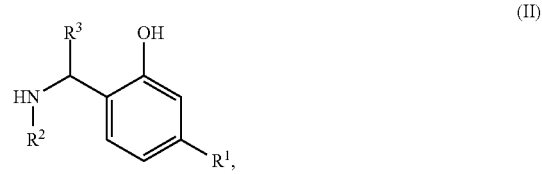

where $R^1$ is a C6-C30 saturated or unsaturated alkyl group; $R^2$ is $H_2N(CH_2CH_2NH)_nCH_2CH_2$—; n is 0 or an integer of at least 1; and $R^3$ is H or an alkyl group.

36. The acidic aqueous conversion coating composition of claim 35, wherein each R is a C6-C30 unsaturated alkyl group.

37. The acidic aqueous conversion coating composition of claim 35, wherein for one or more of the at least two phenalkamine compounds, different from each other, R is —$C_{15}H_{31-x}$ and x is 0, 2, 4 or 6.

38. The acidic aqueous conversion coating composition of claim 35, wherein n is 0, 1, 2, or 3.

39. The acidic aqueous conversion coating composition of claim 35, wherein the mixture comprises a phenalkamine compound wherein the R is a straight chain hydrocarbyl of 12 to 18 carbon atoms comprising 1-4 carbon-carbon double bonds.

40. The acidic aqueous conversion coating composition of claim 35, where R' is a C1-C6 alkyl group.

41. The acidic aqueous conversion coating composition of claim 35, wherein the at least one phenalkamine component comprises at least one phenalkamine compound which is a Mannich reaction product of at least one alkylphenol having at least one C6-C30 saturated or unsaturated alkyl group substituted on a benzene ring, at least one aldehyde, and at least one amine comprised of at least one primary or secondary amino group.

42. The acidic aqueous conversion coating composition of claim 41, wherein the at least one alkylphenol comprises at least two unsaturated isomers of cardanol.

43. The acidic aqueous conversion coating composition of claim 35, additionally comprising one or more additional components selected from the group consisting of copper, free fluoride, zinc, nitrate and Si-based substances.

44. The acidic aqueous conversion coating composition of claim 35, wherein the acidic aqueous conversion coating composition has a pH of 5.0 or less.

45. The acidic aqueous conversion coating composition of claim 35, wherein the at least one phenalkamine component is present in a total concentration of from 5 to 10,000 ppm.

46. The acidic aqueous conversion coating composition of claim 35, wherein the at least one Group IV metal is present in a total concentration of from 50 to 750 ppm.

47. The acidic aqueous conversion coating composition of claim 35, wherein the at least one Group IV metal is present in a total concentration of from 50 to 750 ppm, the at least one phenalkamine component is present in a total concentration of from 5 to 10,000 ppm and total amount of phosphate ions and/or metal phosphate salts is not more than 50 ppm.

48. The acidic aqueous conversion coating composition of claim 35, wherein R is unsaturated.

49. A method of conversion-coating a substrate having a metal surface, comprising a step of contacting the metal surface of the substrate with the acidic aqueous conversion coating composition of claim 35.

* * * * *